(12) United States Patent
Hendrikus Van Montfort et al.

(10) Patent No.: US 7,328,946 B2
(45) Date of Patent: Feb. 12, 2008

(54) CHASSIS AS WELL AS A CHILD VEHICLE SEAT PROVIDED WITH SUCH A CHASSIS

(75) Inventors: Donald Hendrikus Van Montfort, El Heythuyzen (NL); Hans Constant Dikhoff, Veldhoven (NL); Rene Johan Van Geer, AJ Rijswijk (NL)

(73) Assignee: Maxi Miliaan B.V., Heldmond (NL)

( * ) Notice: Subject to any disclaimer, the term of this patent is extended or adjusted under 35 U.S.C. 154(b) by 0 days.

(21) Appl. No.: 11/407,384

(22) Filed: Apr. 18, 2006

(65) Prior Publication Data
US 2007/0069562 A1    Mar. 29, 2007

(30) Foreign Application Priority Data
Apr. 18, 2005    (NL) .................................... 1028788

(51) Int. Cl.
*A47C 1/11*    (2006.01)
(52) U.S. Cl. .................................... 297/253; 297/256.16
(58) Field of Classification Search ................ 297/253, 297/256.16, 256.1
See application file for complete search history.

(56) References Cited

U.S. PATENT DOCUMENTS 6,375,260 B1 *    4/2002    Hiramatsu et al. .. 297/256.16 X
6,764,135 B2 *    7/2004    Sasaki et al. .......... 297/256.16

FOREIGN PATENT DOCUMENTS

| DE | 199 46 579 A1 | 4/2001 |
| EP | 0 952 032 A | 10/1999 |
| EP | 0 970 842 A | 1/2000 |
| EP | 1 344 679 A | 9/2003 |
| EP | 1 477 356 A | 11/2004 |

* cited by examiner

Primary Examiner—Anthony D. Barfield
(74) Attorney, Agent, or Firm—Ladas & Parry, LLP

(57) ABSTRACT

A chassis which is suitable for supporting a child vehicle seat is provided with a frame as well as with connectors that can be detachably connected in use to securing elements that are present in a vehicle. The chassis is further provided with an unlocking mechanism for releasing the engagement between the connector and the securing element. The chassis is provided with a slide for supporting the child vehicle seat, which slide is movable with respect to the frame from a first position, in which the slide is positioned at a relatively large distance from the connector, to a second position, in which the slide is positioned closer to the connector. The slide is locked against movement from the second position to the first position when at least one connector is connected to the securing element.

17 Claims, 10 Drawing Sheets

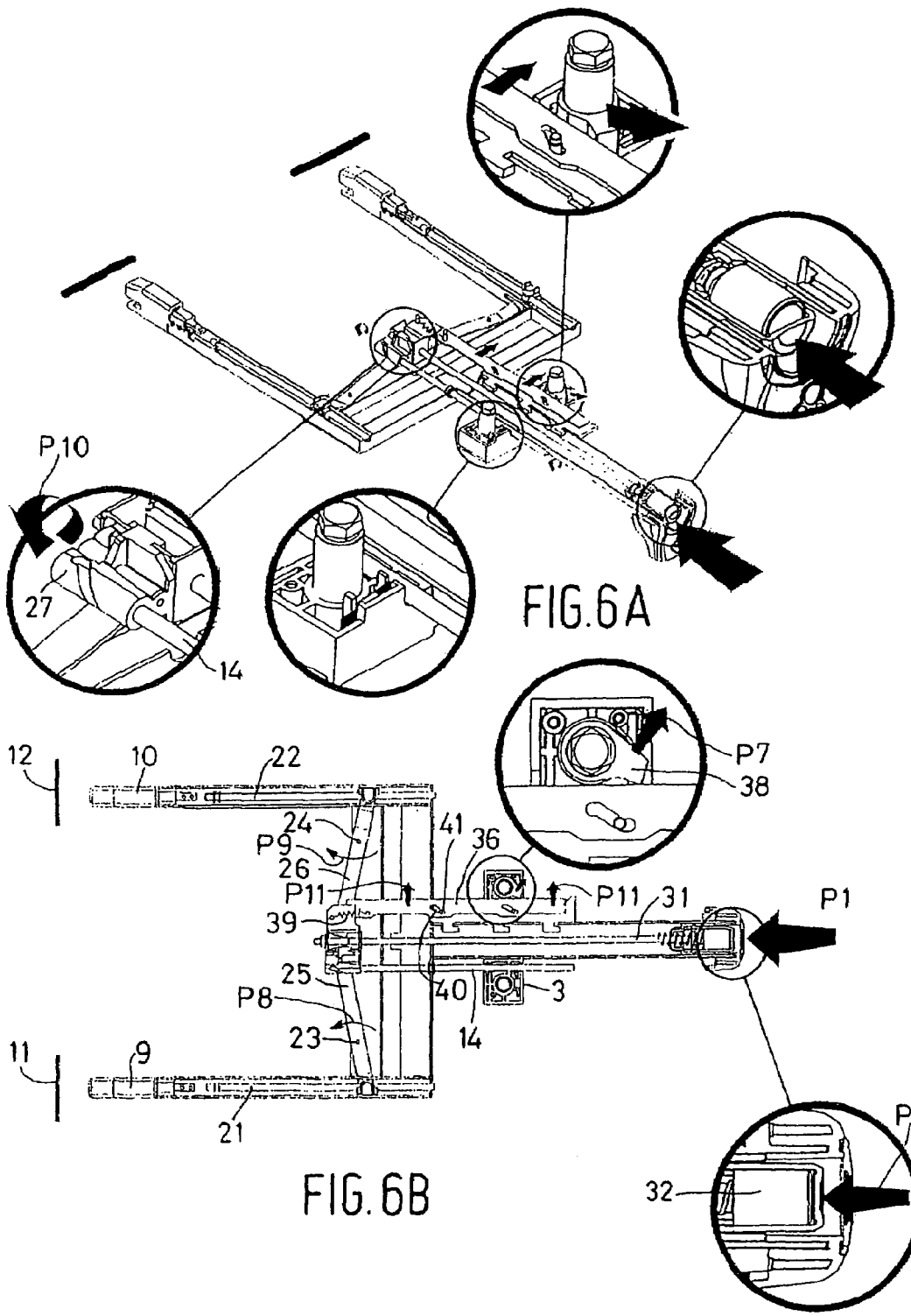

CHASSIS AS WELL AS A CHILD VEHICLE SEAT PROVIDED WITH SUCH A CHASSIS

The invention relates to a chassis suitable for supporting a child vehicle seat, which chassis is provided with a frame comprising at least one connector, which connector can be detachably connected in use to at least one securing element present in a vehicle, which chassis is further provided with an unlocking mechanism for releasing the engagement between the connector and the securing element, as well as with a slide for supporting the child vehicle seat, which slide is movable with respect to the frame in the position in which the connector is connected to the securing element, from a first position, in which the slide is positioned at a relatively large distance from the connector, to a second position, in which the slide is positioned closer to the connector, and vice versa, with the slide being locked against movement from the second position to the first position when the connector is connected to the securing element.

The invention also relates to a child vehicle seat provided with such a chassis.

With such a child vehicle seat, which is known from European patent application EP-A2-0 952 032, each connector is moved to a fully extended position before the child vehicle seat is secured in the vehicle. In this first position, movement to the second position is not possible. Once a connector is connected to the associated securing element, it is possible to move the slide with respect to the frame on the side of the connector in question. If the other connector is not connected to the associated securing element yet, movement of the slide with respect to the frame is not possible on the side of that connector. If the user attempts to connect the child vehicle seat to the associated securing element by exerting a relatively large force, there is a risk that the slide will partially move with respect to the frame already, which will result in damage to child vehicle seat.

The object of the invention is to provide a chassis as well as a child vehicle seat provided with such a chassis in which the slide cannot be moved undesirably with respect to the frame.

This object is accomplished with the chassis according to the invention in that all the connectors are connected to a common releasing mechanism, which allows movement of the slide from the first position to the second position once all the connectors are connected to securing elements.

When such a releasing mechanism is used, it can be arranged in a simple manner that movement of the slide from the first position to the second position is not possible until all the connectors are connected to the securing elements. In this way it is possible to prevent a situation in which the slide can be moved with respect to the frame on one side whereas such movement is not possible on another side, thus making it possible in a simple manner to prevent the chassis and the child vehicle seat from being subjected to undesirable forces or distortions.

In the first position, the slide is positioned at a relatively large distance from the connector, so that it is relatively easy to connect the connector to the securing elements that are present in the vehicle. Once all the connectors are connected to the securing elements, the slide can be moved in the direction of the connector together with the child vehicle seat that is supported by said slide, for example until the child vehicle seat abuts against the back support of the vehicle seat. In the position in which the connector is connected to the securing element, the slide is locked against movement back to the first position, so that the slide and the child vehicle seat that is supported thereby cannot be undesirably moved in a direction away from the connector, for example in case of a collision.

One embodiment of the chassis according to the invention is characterized in that all the connectors are connected to the common unlocking mechanism which, when operated, allows movement of the slide from the second position to the first position.

The connectors are disconnected by operating the unlocking mechanism. Operating the unlocking mechanism also makes it possible for the slide to be moved from the second position to the first position just before, during or after said disconnecting of the connectors. The slide can be moved to the desired first position again in that case, so that the chassis will be in a starting position again, in which it can be connected to securing elements in the same vehicle or in another vehicle. The forces that are exerted on the connection between the connectors and the securing elements by the chassis and/or the child seat that is connected thereto are released by enabling movement of the slide from the second position to the first position, thus making it easier to disconnect the connectors from the securing elements.

Yet another embodiment of the chassis according to the invention is characterized in that all the connections between the connectors and the securing elements can be released substantially simultaneously by means of the unlocking mechanism.

In this way all the connectors can be disconnected practically simultaneously by operating a single unlocking mechanism.

It is noted that with the chassis as known from EP-B1-0 970 842 separate operations are required for disconnecting each of the connectors and enabling movement of the slide from the second position to the first position. As a result, the known chassis is difficult to operate.

Yet another embodiment of the chassis according to the invention is characterized in that each connector is connected to the releasing mechanism via a lever.

A connection between connectors and the releasing mechanism can be realised in a simple manner when levers are used.

Yet another embodiment of the chassis according to the invention is characterized in that the releasing mechanism comprises a shaft that rotates about the central axis, which shaft is provided with a recess near the slide, in which recess a pin that is connected to the slide is positioned in the disconnected position of the connectors, whilst the shaft can be rotated about the central axis by means of the levers in the connected position of the connectors, enabling the pin to be moved out of the recess and the slide to be moved from the first position to the second position.

Such a shaft that rotates about a central axis and a pin that can move into a recess in the shaft form a robust mechanism of relatively simple design.

Yet another embodiment of the chassis according to the invention is characterized in that the chassis is provided with a ratchet mechanism comprising a rack and a cam that is in engagement with said rack, the frame being provided with the rack and the slide being provided with the cam, or vice versa, by means of which ratchet mechanism the slide can be moved with respect to the frame from the first position to the second position, whilst the cam locks the slide against movement from the second position to the first position.

When such a ratchet mechanism is used, movement of the slide from one position to another position can be effected in a simple manner, whilst the slide is locked against movement in the opposite direction by the cam. Such a ratchet mechanism is relatively easy to produce and reliable in use.

Yet another embodiment of the chassis according to the invention is characterized in that the cam can be moved out of engagement with the rack by means of the unlocking mechanism, in which position the slide can be moved from the second position to the first position.

The connection between the connector and the securing element is released by means of the unlocking mechanism. Simultaneously therewith, the engagement between the cam and the rack is released, so that the slide can be moved back from the second position to the first position. In this way a user only needs to operate the unlocking mechanism for disconnecting the connectors as well as enabling movement of the slide from the second position to the first position again.

Yet another embodiment of the chassis according to the invention is characterized in that the unlocking mechanism is provided with at least one indicator that functions to indicate whether or not all the connectors are disconnected from or connected to securing elements.

In this way it is not only the fact that the slide can or cannot be moved to a particular position that tells the user that all the connectors are connected to the associated securing elements, but he or she can also visually ascertain this from the unlocking mechanism.

Yet another embodiment of the chassis according to the invention is characterized in that the unlocking mechanism is disposed near a side of the frame remote from the connectors.

In this way the unlocking mechanism will be positioned on a side of the chassis that is readily accessible to the user.

Yet another embodiment of the chassis according to the invention is characterized in that the frame is provided with a supporting leg on a side remote from the connector, which supporting leg is pivotally connected to the frame.

Any pivoting of the chassis about the securing elements, for example in case of a collision of the vehicle, is prevented in a simple yet effective manner by means of such a supporting leg being supported on the vehicle floor.

Another embodiment of the chassis according to the invention is characterized in that the supporting leg is provided with at least one indicating means at one end, which indicating means functions to indicate whether a predetermined minimum force is being exerted on one end of the supporting leg.

In this way a user can visually determine whether the supporting leg abuts firmly against the vehicle.

Yet another embodiment of the chassis according to the invention is characterized in that the slide comprises a base element, to which a child vehicle seat can be detachably connected.

In this way a child vehicle seat can easily be removed from the base element and be used outside the vehicle for transporting the child. The chassis can remain behind in the vehicle in that case together with the base element that is mounted to the slide.

One embodiment of the chassis according to the invention is characterized in that the slide is locked against movement from the second position to the first position in the position in which all the connectors are connected to securing elements.

In this way a user who is placing the chassis in a vehicle can easily determine from the fact that the slide can be moved freely from the second position to the first position that not all the connectors are connected to the securing elements. This is necessary, however, in order to ensure a reliable connection between the chassis and the vehicle.

Yet another embodiment of the chassis according to the invention is characterized in that the slide is locked against movement from the first position of the second position in the position in which the connector is disconnected from the securing element.

In the first position, the connectors are spaced from the slide and the child vehicle seat supported by the slide by a relatively large distance. In said first position, it is relatively easy to connect the connectors to the securing elements that are present in the vehicle, therefore. The slide cannot move with respect to the connectors whilst said connection is being effected, thereby enabling a user to take a firm hold of the slide or of the child vehicle seat that is connected thereto and exert the required force thereon for connecting the connectors to the securing elements.

Once all the connectors are connected to the associated securing elements, movement of the slide in the direction of the connectors is possible, so that the slide and the child vehicle seat supported by said slide can be moved in the direction of the connectors that are connected to the securing elements, for example until the child vehicle seat abuts against the back support of the vehicle seat.

Another embodiment of the chassis according to the invention is characterized in that the slide is locked against movement from the first position to the second position in the position in which all the connectors are disconnected from the securing elements.

In this way a user who is fitting the chassis in the vehicle can determine that not all the connectors are connected to the associated securing elements from the fact that movement of the slide towards the connectors is not possible.

All the connectors need to be connected to the associated securing elements in order to ensure a secure engagement between the chassis and the vehicle.

The invention also relates to a child vehicle seat provided with a chassis as described above. The child vehicle seat may be fixedly or detachably connected to the slide, depending on which is desired.

The invention will now be explained in more detail with reference to the drawings, in which.

Figure 1:
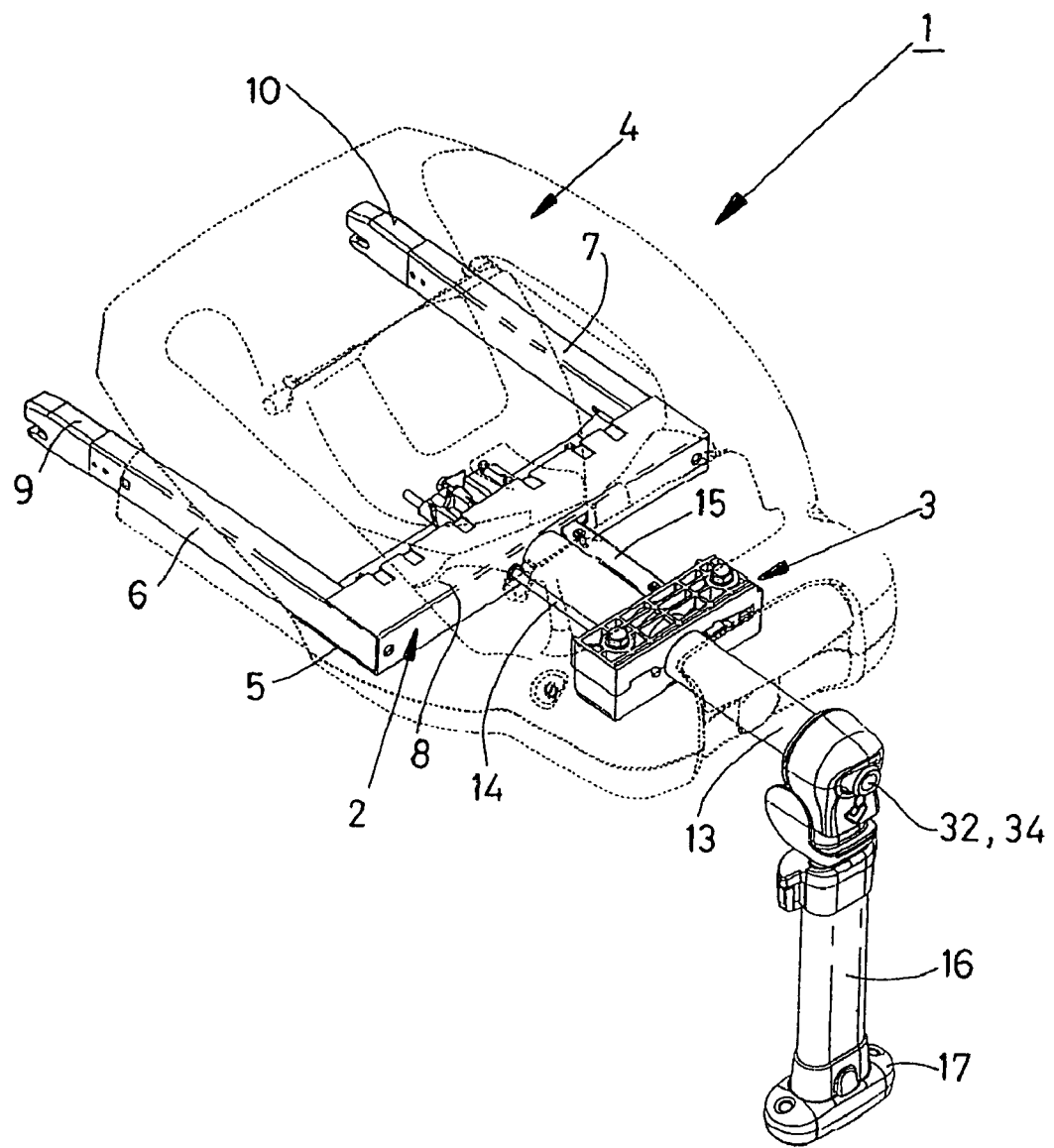
FIG. 1 is a perspective view of the chassis according to the invention, which comprises a base element supported by the chassis.
Figure 2:
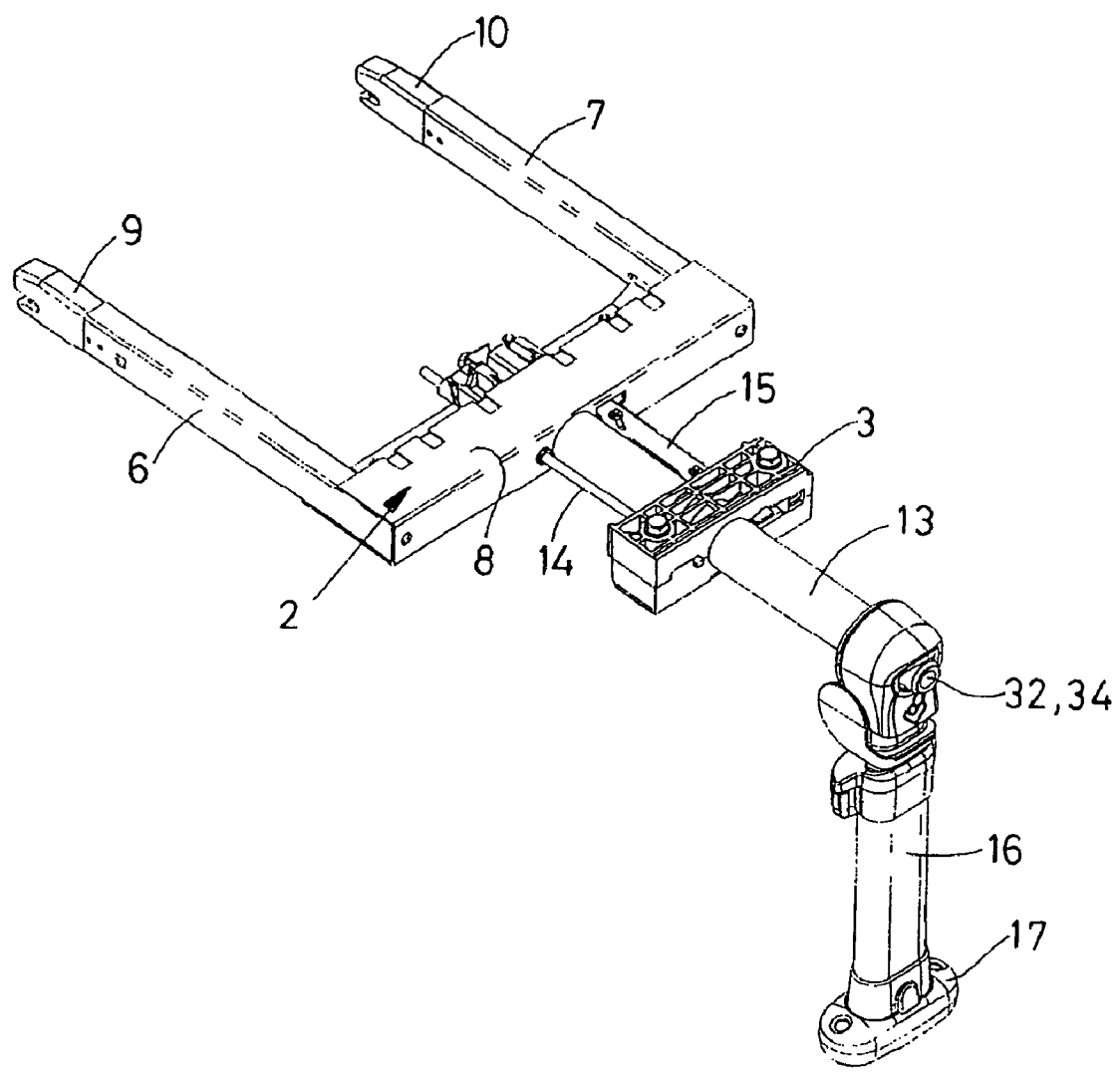
FIG. 2 shows the chassis of FIG. 1.
Figure 3A:
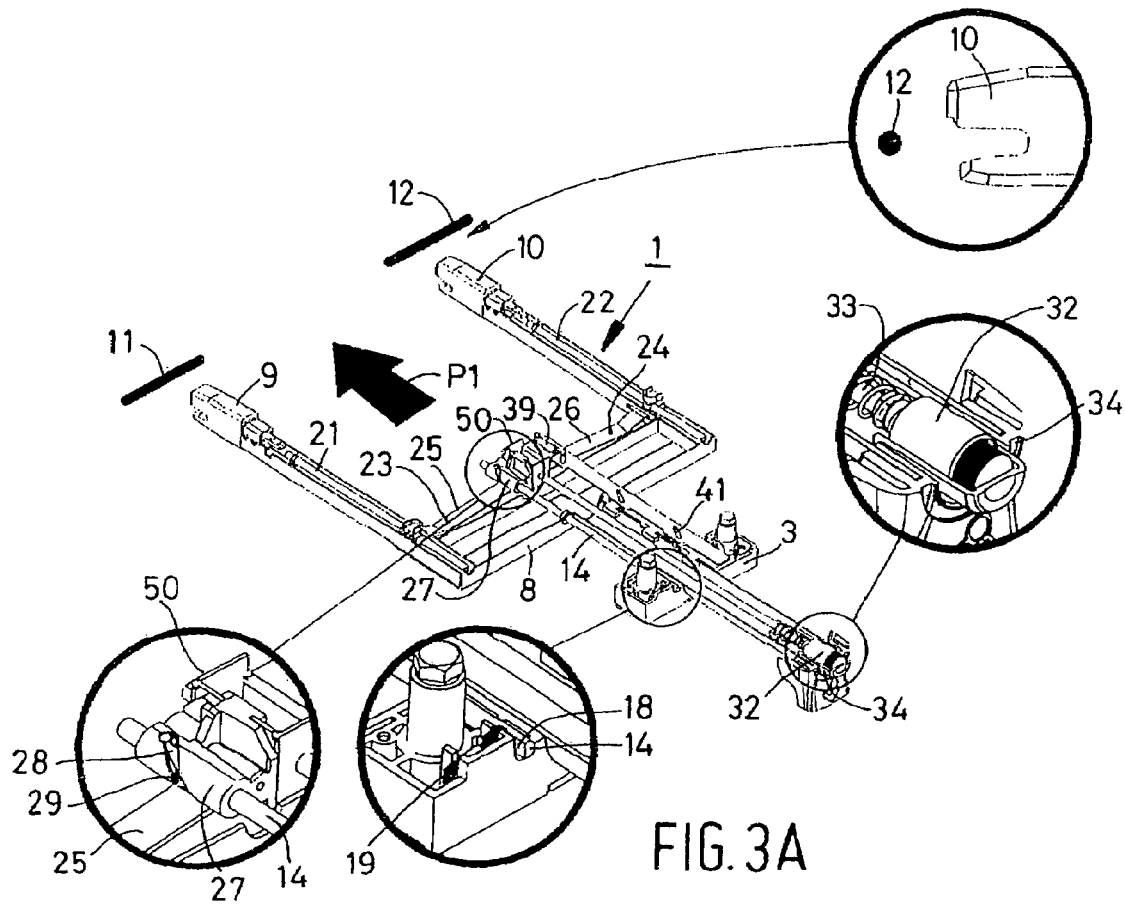
FIGS. 3A-3D are perspective views and top plan views including larger-scale details of the chassis of FIG. 1, showing the situation before the connectors are connected.
Figure 3B:
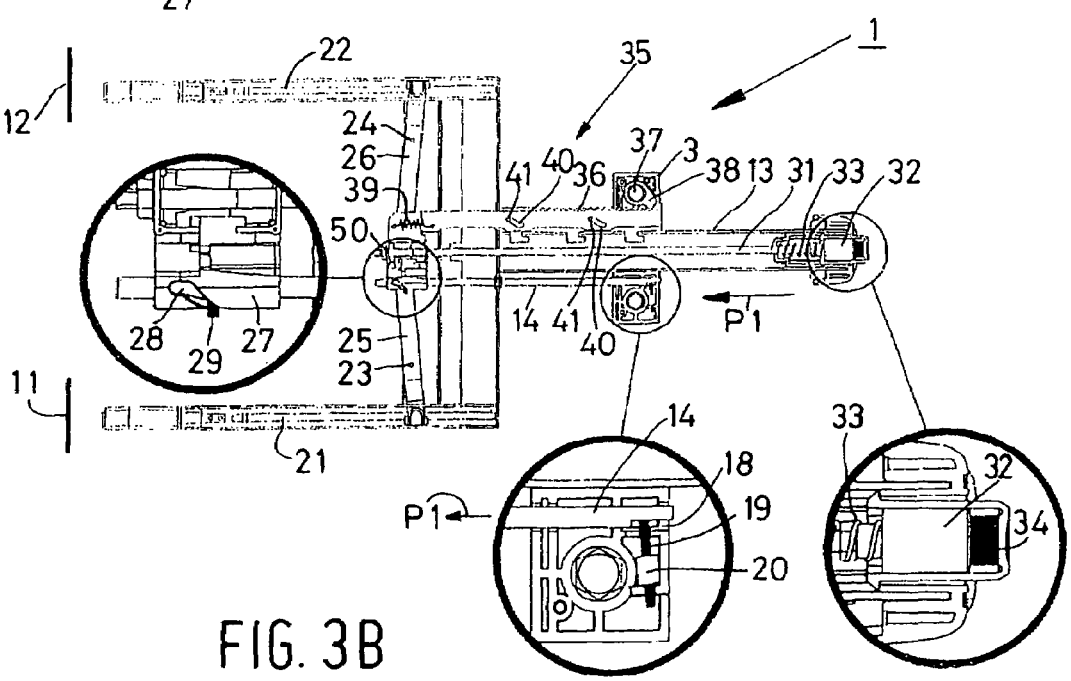
Figure 3C:
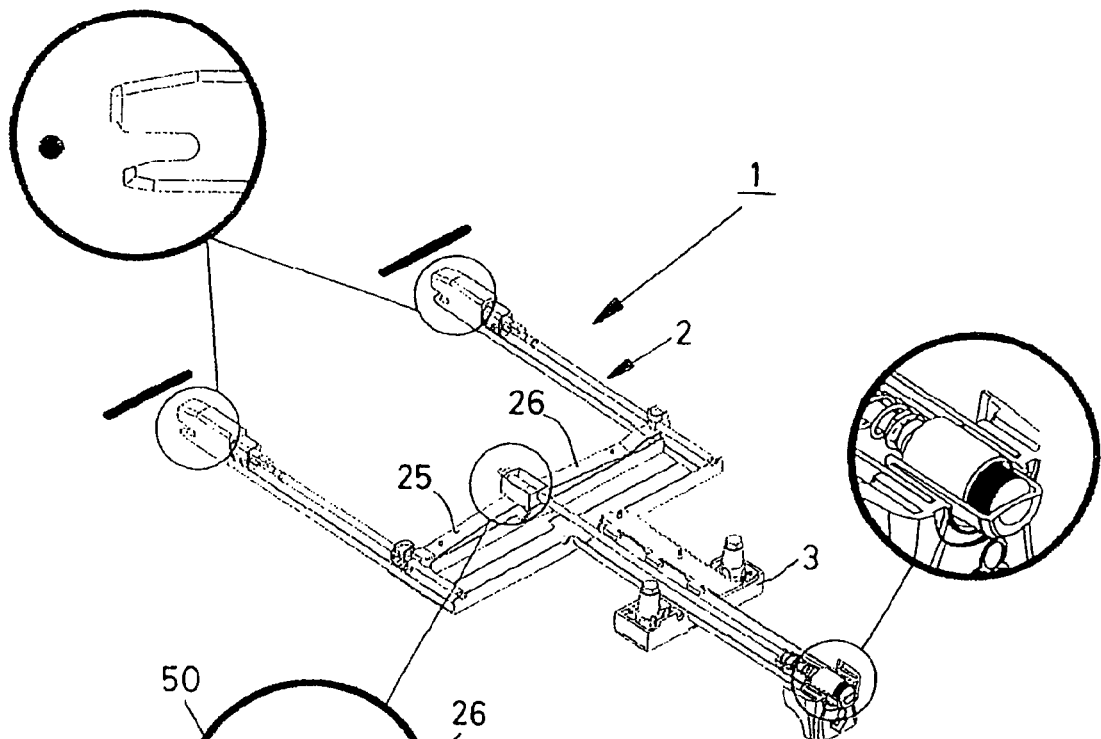
Figure 3D:
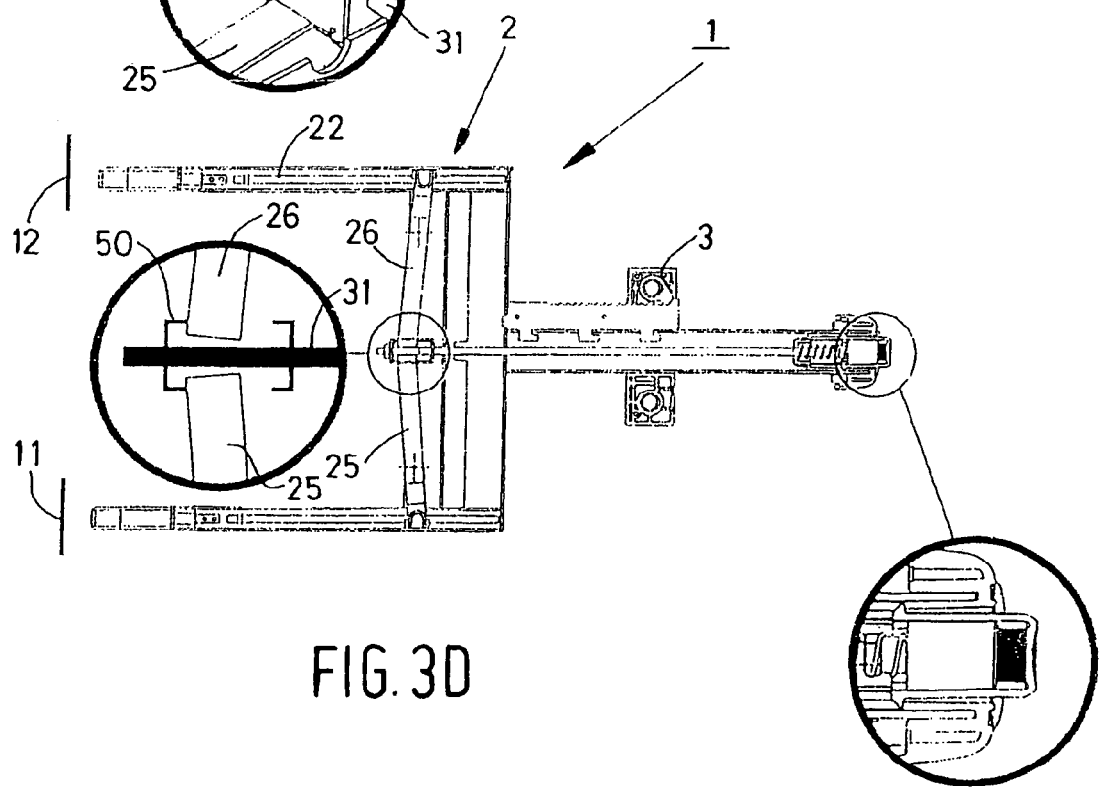
Figure 4A:
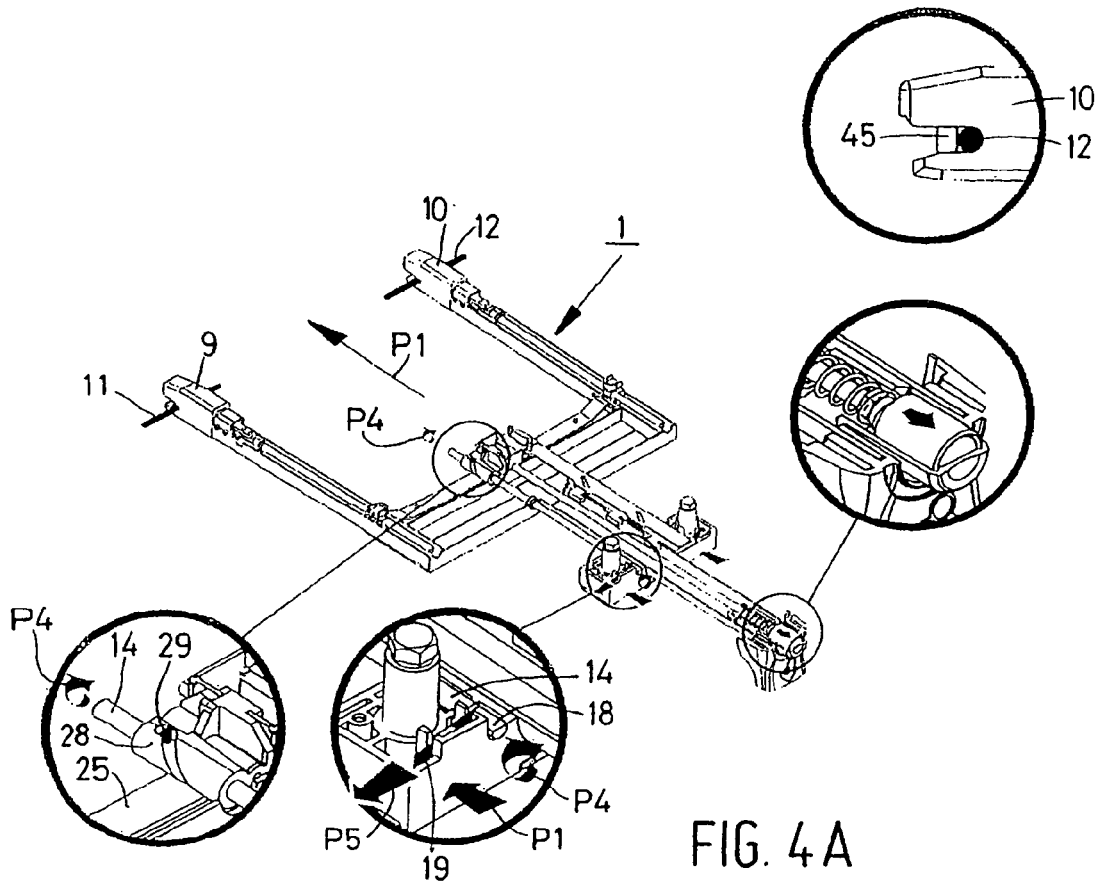
FIGS. 4A-4F are perspective views and top plan views including larger-scale details of the chassis of FIG. 1, showing the situation when the connectors are being connected to the securing elements.
Figure 4B:
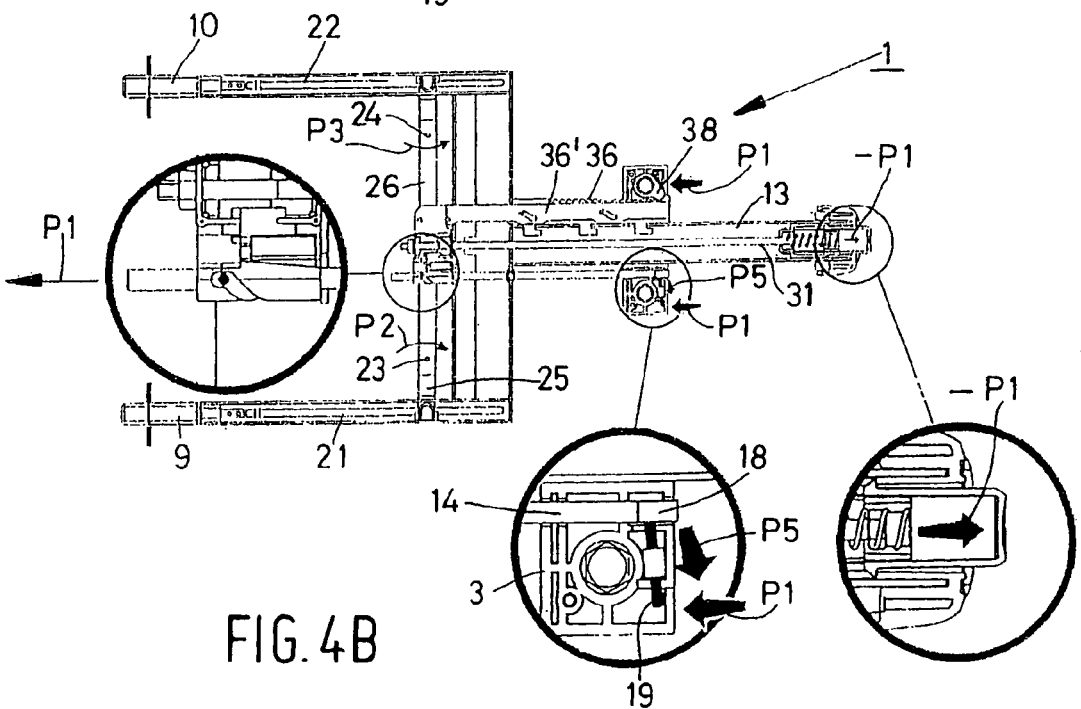
Figure 4C:
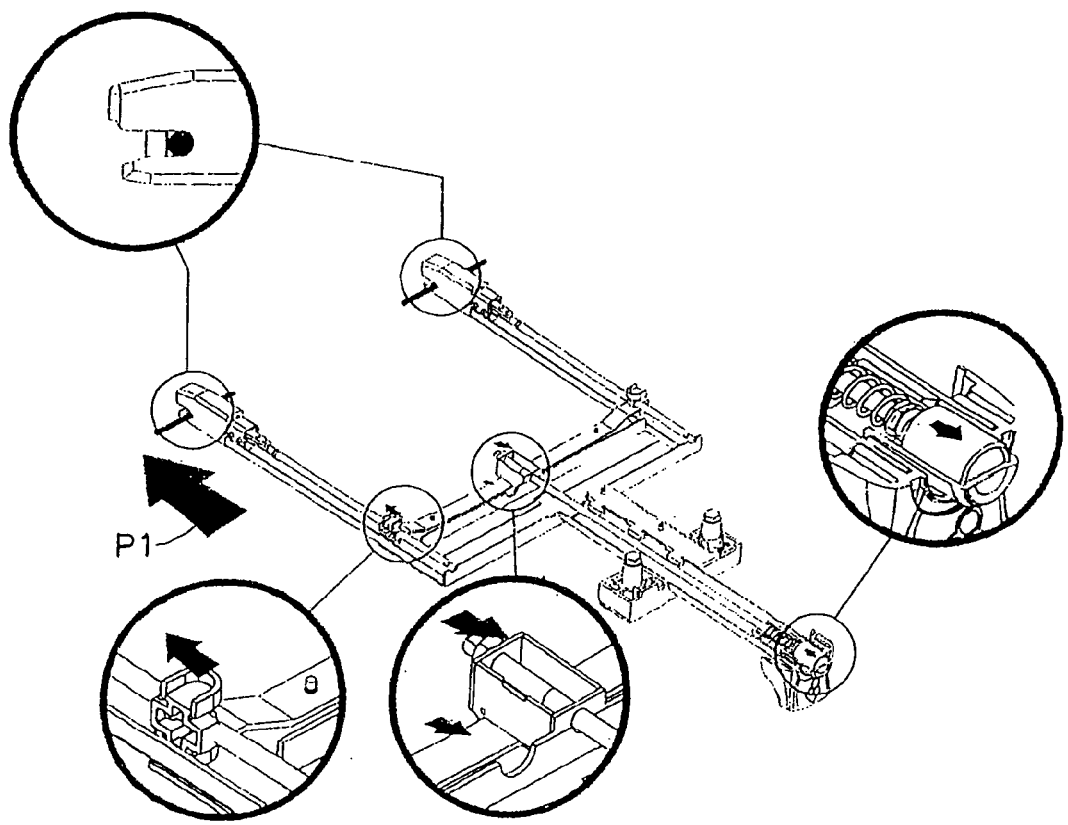
Figure 4D:
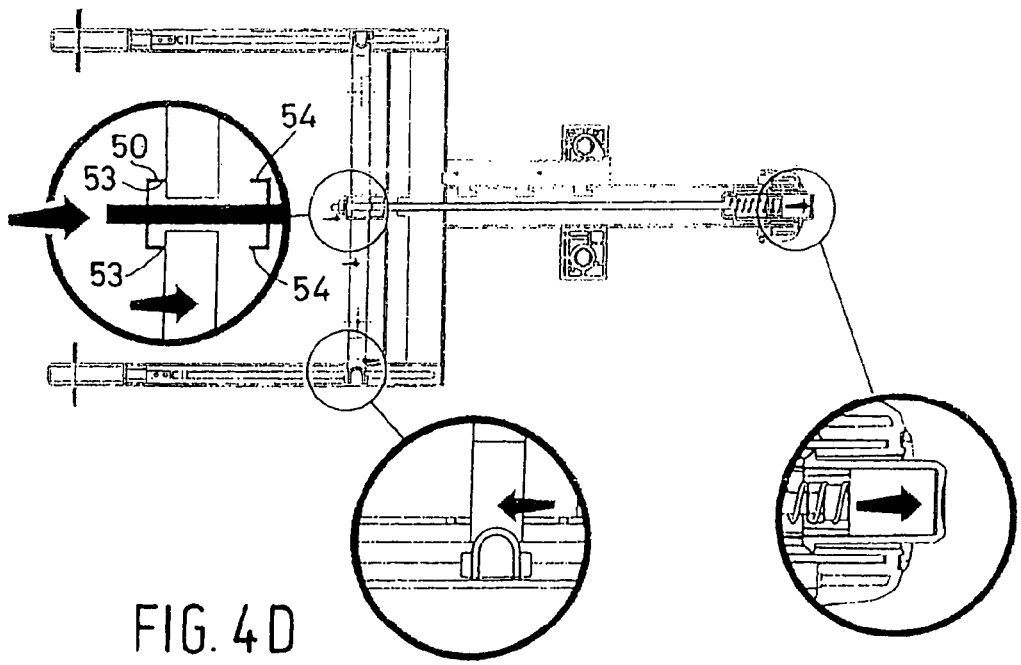
Figure 4E:
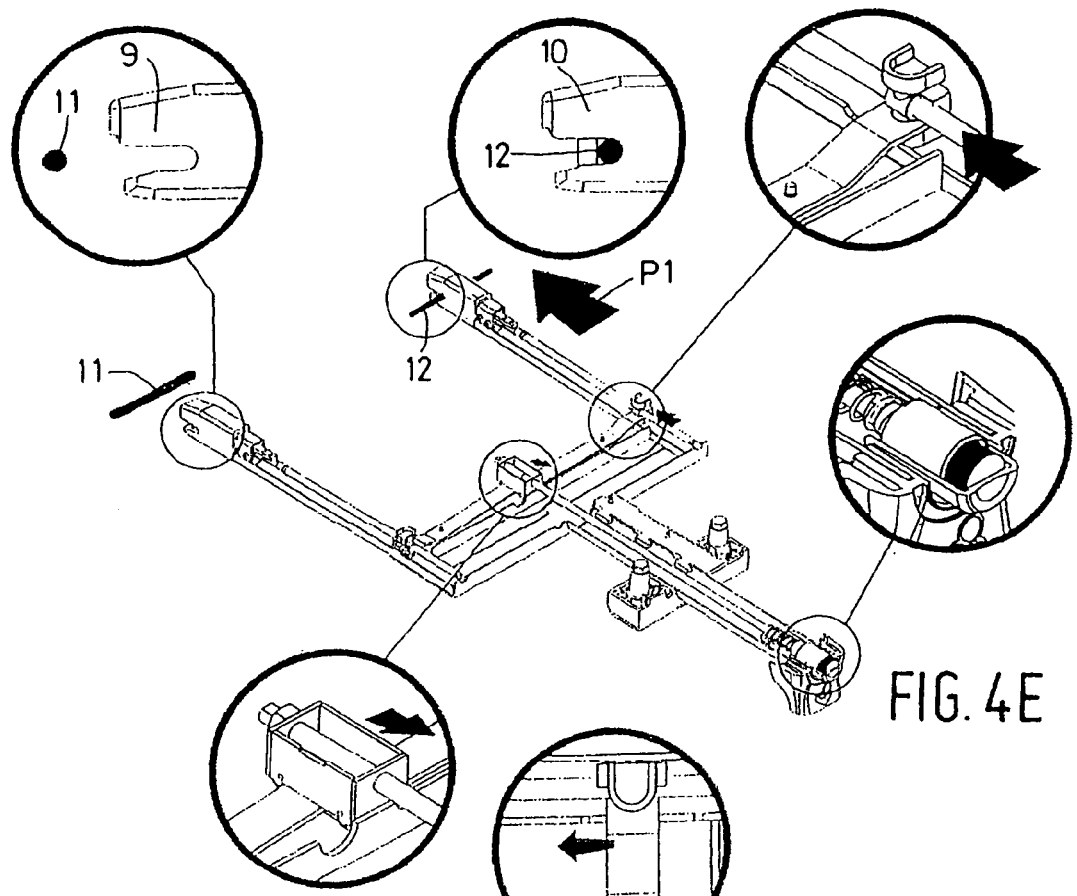
Figure 4F:
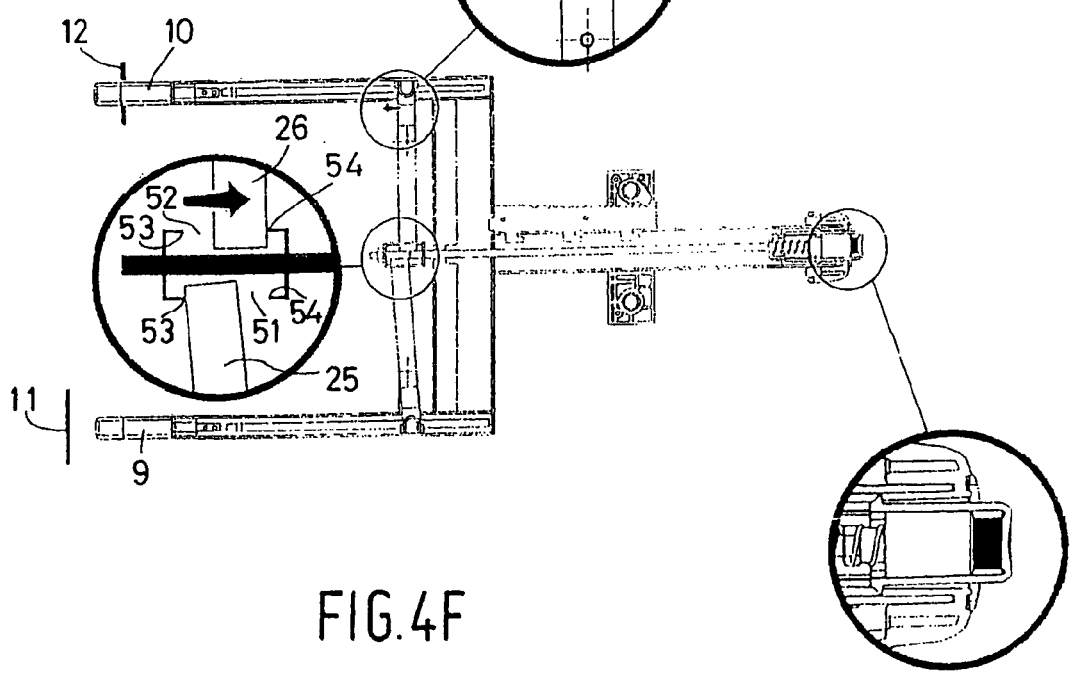
Figure 5A:
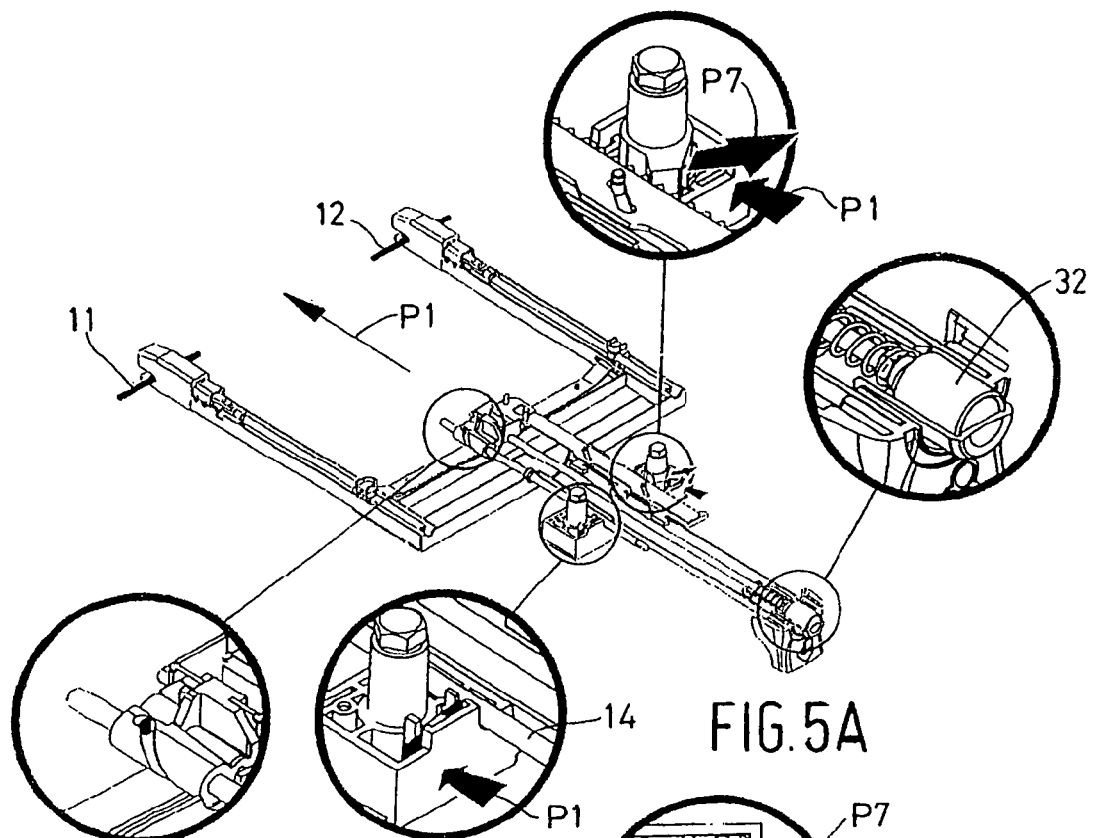
Figure 5B:
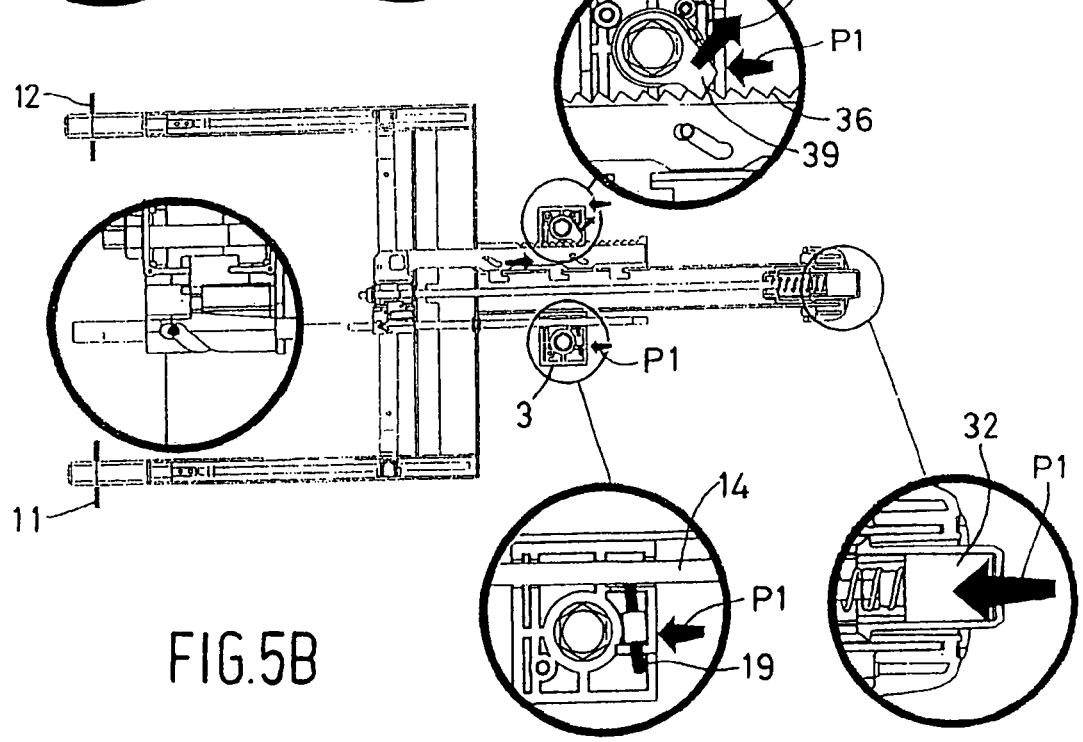
Figure 6C:
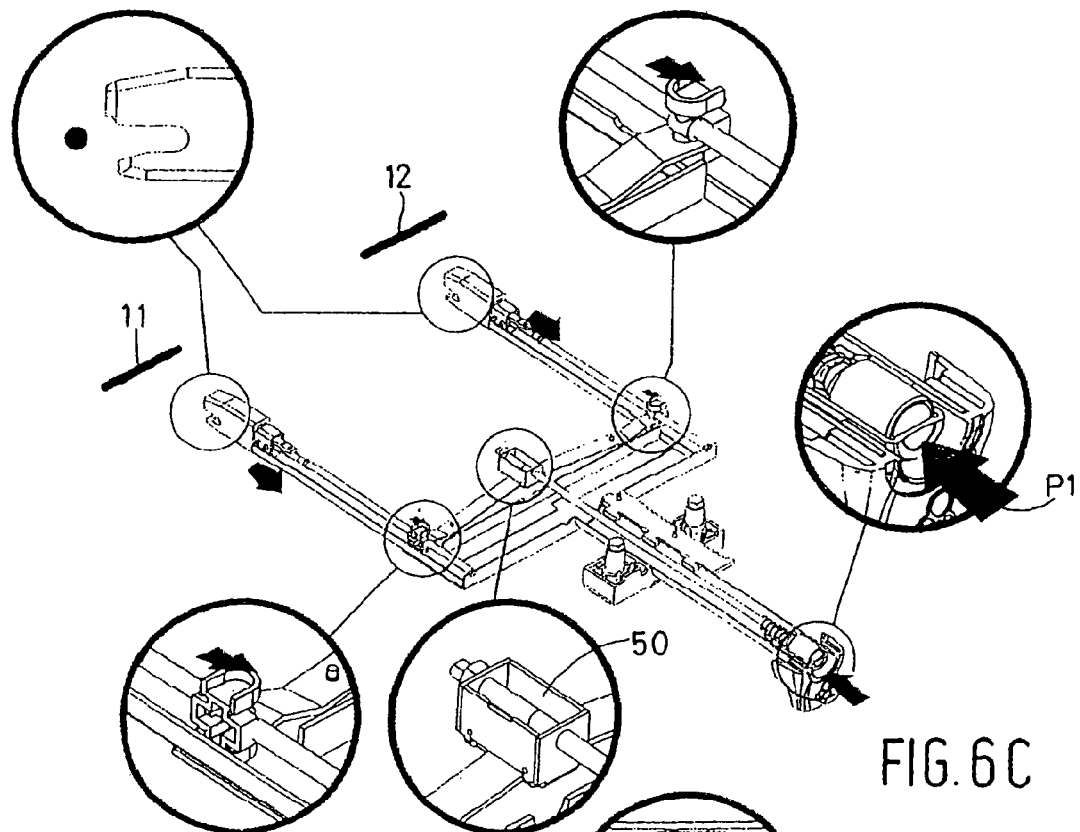
Figure 6D:
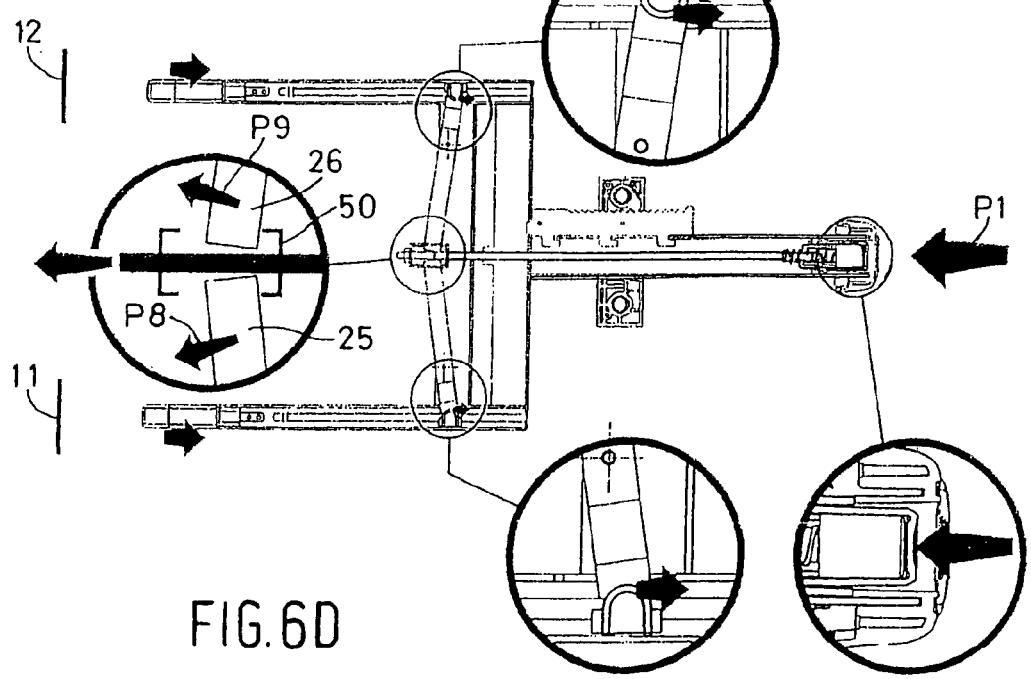

FIGS. 5A and 5B are a perspective view and a top plan view, respectively, including larger-scale details of the chassis of in FIG. 1, showing the situation when the slide is being moved to the second position; and FIGS. 6A-6D are perspective views and top plan views including larger-scale details of the chassis of FIG. 1, showing the situation when the connectors are being disconnected from the securing elements.

Like parts are indicated by the same numerals in the figures.

FIG. 1 shows a chassis 1 according to the invention, which comprises a frame 2, a slide 3 that is movable with respect to the frame 2 and a base element 4 supported by the slide 3. A child vehicle seat can be detachably connected to the base element 4 in a manner that is known per se. The frame 2 comprises a U-shaped frame portion 5, which comprises two legs 6, 7 that extend parallel to each other and a bridge portion 8 that interconnects the legs. The legs 6, 7 are provided with connectors 9, 10 on sides remote from the bridge portion 8, which connectors can be detachably connected to securing elements 11, 12 that are present in a vehicle (see FIGS. 3A-6D). Disposed on a side of the bridge portion 8 that faces away from the legs 9, 10 is a tube 13, which extends transversely to the bridge portion 8. The frame 2 is furthermore provided with a shaft 14 that extends parallel to the tube 13, which shaft is rotatably supported in the bridge portion 8 and which extends through the slide 3. The frame 2 is furthermore provided with a rack 15 that extends parallel to the tube 13, through the slide 3. On a side remote from the bridge portion 8, the tube 13 is provided with a supporting leg 16, which is pivotable about a pivot axis that extends parallel to the bridge portion 8. The supporting leg 16 is telescopic and is provided with indicating means 17 near a side remote from the tube 13, which indicating means 17 shows up green or red, depending on whether a pressure is or is not being exerted on the underside of the supporting leg 16. The indicating means 17 may be provided with a tilting mechanism, for example, which can tilt against spring force, so that a different colour will show up.

The chassis 1 will now be explained in more detail with reference to FIGS. 3A-6D.

FIGS. 3A-6D are perspective views and top plan views of the chassis 1 that is shown in FIG. 1, in which a cover of the bridge portion 8 as well as part of the tube have been removed, among other parts, so as to provide a better view of the interior of the chassis 1. Relevant details are shown in larger-scale view in a few encircled portions.

In the position of the connectors and the slide 3 that is shown in FIGS. 3A-3D, the connectors 9, 10 are not connected to the securing element 11, 12 yet, and the slide 3 is in the first position. The shaft 14 is positioned in the slide 3 with one end thereof, being provided with a recess 18 near said end. Positioned in said recess 18 is one end of a pin 19, which pin is slidably supported in a bush 20 that is connected to the slide 3. As a result of the presence of the pin 19 in the recess 18, movement of the slide from the first position as shown in FIGS. 3A-3D in the direction of the connectors 9, 10 is not possible. The connectors 9, 10 are connected to shafts 21, 22, respectively, which are positioned in the associated legs 6, 7. The shafts 21, 22 are connected at their ends remote from the connectors 9, 10 to levers that are pivotable about pivot pins 23, 24. On a side remote from the shaft 21, the ends of the levers 25, 26 are slidably supported in a box-like element 50 that is located near the centre of the bridge portion 8. On a side facing towards the lever 25, the box-like element 50 is provided with a bush 27, in which the shaft 14 is slidably supported. The bush 27 is provided with a groove 21 that extends obliquely over the circumference of the bush, in which a pin 29 that is connected to the shaft 14 is present. The box-shaped element 50 is provided with two recesses 51, 52, in which ends of the levers 25, 26 are positioned. The width of the recesses 51, 52 is greater than that of the levers 25, 26.

The box-like element 50 is connected to a pin 31 that extends within the tube 13. The pin 31 is pressed in the opposite direction of the arrow P1 under the influence of a spring 33. The pin 31 is provided with a sleeve 32 on a side remote from the levers 25, 26. Disposed within the sleeve 32 is a cap 34, which is movable in the direction indicated by the arrow P1 against the spring force of a spring (not shown). The cap 34 is preferably coloured red, whilst the sleeve 32 is preferably coloured green. The red cap 34 indicates that the connectors 9, 10 are not connected to the securing elements 11, 12. The chassis 1 is furthermore provided with a ratchet mechanism 35, which comprises a rack 36 that is connected to the bridge portion 8 and a cam 38 that is pivotally connected to the slide 3 via a pivot pin 37, which cam engages with the rack 36 under spring force. The rack 36 extends parallel to a strip 36' provided with two slots 40 that extend parallel to each other, at an angle to the rack 36, in which slots 40 pins 41 that are connected to the rack 36 are positioned. The strip 36' is connected to the box-shaped element 50 via a spring 39.

As already indicated above, FIGS. 3A-3D show the chassis 1 in the starting position from which the chassis 1 can be connected to the securing elements 11, 12. The slide 3 is locked against movement in the direction of the connectors 9, 10 by the pin 19 and the recess 18 in the shaft 14. The red cap 34 indicates that the connectors 9, 10 are disconnected from the securing elements.

Usually, a base element as shown in FIG. 1 or a child vehicle seat that is known per se are present on the slide 3.

When a user wishes to connect the chassis 1 to the securing elements 11, 12, he or she will move the chassis 1 in the direction indicated by the arrow P1 until the connectors 9, 10 have slid over the securing elements 11, 12 (see FIGS. 4A-4D). Once the connectors 9, 10 are pressed against the securing element 11, 12 with sufficient force, a hook 45 provided in each of the connectors 9, 10 is activated, which hook engages round the associated securing element 11, 12, thus connecting the connectors 9, 10 securely to the securing element 11, 12 in question. Such a connection is known per se and will not be explained in more detail herein, therefore. Once the hook-shaped element 45 has taken up the position that is shown in the uppermost circle in FIG. 4A, the shaft 21, 22 associated with the connector 9, 10 in question is moved in the direction indicated by the arrow P1, causing the associated lever 25, 26 to pivot about the respective pivot pin 23, 24 in the directions indicated by the arrows P2 and P3, respectively. Once the two levers 25, 26 have been moved from the position that is shown in FIGS. 3A-3D to the position that is shown in FIGS. 4A-4D, the box-shaped element 50 and the bush 27 that is connected thereto are moved in the opposite direction of the arrow P1. This causes the pin 29 that is present in the groove 28 in the bush 27 to move through the groove 28 and the shaft 14 that is connected to the pin 29 to rotate about the central axis in the direction indicated by the arrow P4. As a result, the end of the shaft 14 that is present in the slide 3 will also be rotated in the direction indicated by the arrow P4, and the pin 19 will be moved into the bush 20 in the direction indicated by the arrow P5, away from the shaft 14. The pin 19 is now no longer positioned in the recess 18, and the slide 3 can now be moved in the direction indicated by the arrow P1 towards the connectors 9, 10. The cam 38 now moves freely over the rack 36. Movement of the slide 3 in a direction opposite to the direction indicated by the arrow P1 is prevented in a simple manner by the cam 38, however, which will engage the rack 36. The user will move the slide 3 and the child vehicle seat that is connected to the slide 3 in the direction indicated by the arrow P1 until the child vehicle seat firmly abuts against the vehicle seat.

Once the levers 25, 26 have both taken up the position that is shown in FIGS. 4A-4D, the pin 31 that is connected to the box-shaped element 50 will also be moved in the opposite direction of the arrow P1, as a result of which the green sleeve 32 is slid over the red cap 34. This enables the user to ascertain that the two connectors 9,10 are connected to the associated securing elements 11, 12.

If one connector 10 is connected to the associated securing element 11, 12 and the other connector 9 is not (see FIGS. 4E and 4F), the associated lever 25 will not be pivoted in the direction indicated by the arrow P2. One lever 25 will abut against an edge 53 of the recess 51 in the box-shaped element 50 in that case, whilst the other lever 26 will abut against an edge 54 of the recess 52, which is positioned opposite the edge 53, on the other side. Consequently, the box-shaped element 50 will not be moved in the opposite direction of the arrow P1, the shaft 14 will not be rotated in the direction indicated by the arrow P4 and movement of the slide 3 from the first position as shown in FIGS. 3A-3D in the direction of the connectors 9, 10 will not be possible. In addition, the pin 31 will not be moved in the opposite direction of the arrow P1, so that the red cap will remain visible to the user. The user is thus given two indications that the chassis 1 is not correctly connected to the connectors 9, 10. For the sake of clarity the securing elements 11, 12 are staggered relative to each other in FIGS. 4E and 4F. In practice the securing element will be positioned near the connector in the unconnected condition of the connector.

FIGS. 5A and 5B show the situation in which the chassis 1 is connected to the securing elements 11, 12 and in which the slide 3 has moved from the first position to a desired second position, with the child vehicle seat that is connected to the slide 3 firmly abutting against the vehicle seat. Movement of the slide 3 in the opposite direction of the arrow P1 is prevented as a result of the engagement of the cam 38 with the rack 36.

When the user wishes to disconnect the chassis 1 from the securing elements 11, 12, the user will press the cap 34 together with the sleeve 32 in the direction indicated by the arrow P1, as a result of which the pin 31 that is connected to the sleeve 32 and the box-shaped element 50 that is connected thereto will likewise be moved in the direction indicated by the arrow P1. As a result, the levers 25, 26 that are positioned in the box-shaped element 50 will be pivoted about the pivot pins 23, 24 in the directions indicated by the arrows P8, P9 (see FIGS. 6A-6D). The shafts 21, 22 that are connected to the levers 25, 26 are thus moved in the opposite direction of the arrow P1, as a result of which the latching hooks 45 are disengaged from the securing elements 11, 12, thereby disconnecting the connectors 9, 10.

When the box-shaped element 50 is moved, the bush 27 that is connected thereto is moved as well, and the pin 27 that is positioned in the groove 28 is rotated, together with the shaft 14, in the opposite direction of the arrow P4 as indicated by the arrow P10, as a result of which the recess 18 of the shaft 14 is returned to the position that is shown in FIGS. 3A-3D. To move the slide 3 from the second position to the desired first starting position, the strip 36' that is connected to the box-shaped element 50 by means of a spring 39 is moved with respect to the bridge portion 8 when a sufficiently large force is exerted on the sleeve 32 and the cap 34, causing the strip 36' to slide over the pins 41 via the slots 40, moving in a direction indicated by the arrow P11, transversely to the direction indicated by the arrow P1. As a result, the cam 38 is moved against spring force in the direction indicated by the arrow P7, out of engagement with the rack 36.

Once the slide 3 has taken up the first starting position, the user can release the sleeve 32 and the cap 34, after which the strip 36' will take up the position that is shown in FIGS. 3A, 3B again. The cap 34, too, will return to the position in which it projects from the sleeve 32, so that it will be apparent to the user that the connectors 9, 10 are no longer connected to the securing elements 11, 12. The unlocking mechanism formed in part by the sleeve 32 and the cap 34 thus functions to indicate whether the connectors are connected to the securing elements or not, and to disconnect the connectors 9, 10 from the securing elements. The unlocking mechanism also makes it possible to move the slide 3 from the second position to the first position again.

Once the slide 3 has taken up the first position, the pin 19 will be moved in the opposite direction of the arrow P5 under spring force and be positioned in the recess 18. In that situation subsequent movement of the slide 3 in the direction indicated by the arrow P1 is no longer possible, as already explained with reference to FIGS. 3A and 3B.

The invention claimed is:

1. A chassis suitable for supporting a child vehicle seat, which chassis is provided with
   a frame comprising
      at least one connector, which connector can be detachably connected in use to at least one securing element present in a vehicle,
   which chassis is further provided with
      an unlocking mechanism for releasing the engagement between the connector and the securing element,
   as well as with
      a slide for supporting the child vehicle seat, which slide is
         detachably connectable with the child vehicle seat and is
         movable with respect to the frame in the position in which the connector is connected to the securing element, from a first position, in which the slide is positioned at a relatively large distance from the connector, to a second position, in which the slide is positioned closer to the connector, and vice versa, with the slide being
         locked against movement from the second position to the first position when the connector is connected to the securing element, characterized in that all the connectors are connected to
      a common releasing mechanism, which allows movement of the slide from the first position to the second position once all the connectors are connected to securing elements; and wherein the child vehicle seat, when connected with the slide, moves with the slide as the slide moves from the first position to the second position and vice versa.

2. A chassis according to claim 1, characterized in that all the connectors are connected to the common unlocking mechanism which, when operated, allows movement of the slide from the second position to the first position.

3. A chassis according to claim 1, characterized in that all the connections between the connectors and the securing elements can be released substantially simultaneously by means of the unlocking mechanism.

4. A chassis according to claim 1, characterized in that each connector is connected to the releasing mechanism via a lever.

5. A chassis according to claim 4, characterized in that the releasing mechanism comprises a shaft that rotates about the central axis, which shaft is provided with a recess near the slide, in which recess a pin that is connected to the slide is positioned in the disconnected position of the connectors, whilst the shaft can be rotated about the central axis by means of the levers in the connected position of the connectors, enabling the pin to be moved out of the recess and the slide to be moved from the first position to the second position.

6. A chassis according to claim 1, characterized in that the chassis is provided with a ratchet mechanism comprising a rack and a cam that is in engagement with said rack, the frame being provided with the rack and the slide being provided with the cam, or vice versa, by means of which ratchet mechanism the slide can be moved with respect to the frame from the first position to the second position, whilst the cam locks the slide against movement from the second position to the first position.

7. A chassis according to claim 6, characterized in that the cam can be moved out of engagement with the rack by means of the unlocking mechanism, in which position the slide can be moved from the second position.

8. A chassis according to claim 1, characterized in that the unlocking mechanism is provided with at least one indicator that functions to indicate whether or not all the connectors are disconnected from or connected to securing elements.

9. A chassis according to claim 1, characterized in that the unlocking mechanism is disposed near a side of the frame remote from the connectors.

10. A chassis according to claim 1, characterized in that the frame is provided with a supporting leg on a side remote from the connector, which supporting leg is pivotally connected to the frame.

11. A chassis according to claim 10, characterized in that the supporting leg is provided with at least one indicating means at one end, which indicating means functions to indicate whether a predetermined minimum force is being exerted on one end of the supporting leg.

12. A chassis according to claim 1, characterized in that the slide comprises a base element, to which a child vehicle seat can be detachably connected.

13. A chassis according to claim 1, characterized in that the slide is locked against movement from the second position to the first position in the position in which all the connectors are connected to securing elements.

14. A chassis according to claim 1, characterized in that the slide is locked against movement from the first position of the second position in the position in which the connector is disconnected from the securing element.

15. A chassis according to claim 14, characterized in that the slide is locked against movement from the first position to the second position in the position in which all the connectors are disconnected form the securing elements.

16. A child vehicle seat provided with a chassis according to claim 1.

17. A chassis according to claim 1 wherein the slide includes a base element wherein the child vehicle seat is detachably connectable with the slide by being detachably connectable to the base element.

* * * * *